July 5, 1927.  
T. S. MILLER  
1,634,912  
ENGINE  
Filed July 5, 1923  
2 Sheets-Sheet 1

INVENTOR  
Thomas Spencer Miller  
BY  
Gifford, Bull & Scull  
ATTORNEYS

July 5, 1927.

T. S. MILLER

ENGINE

Filed July 5, 1923

1,634,912

2 Sheets-Sheet 2

INVENTOR
Thomas Spencer Miller
BY
ATTORNEYS

Patented July 5, 1927.

1,634,912

UNITED STATES PATENT OFFICE.

THOMAS SPENCER MILLER, OF SOUTH ORANGE, NEW JERSEY.

ENGINE.

Application filed July 5, 1923. Serial No. 649,680.

My present invention relates to power actuated engines particularly adapted for use as towing or mooring engines, or in other situations where substantially constant tension on a hawser is desired, and will be best understood from the following description and the accompanying drawings of an illustrative embodiment.

Figure 1:
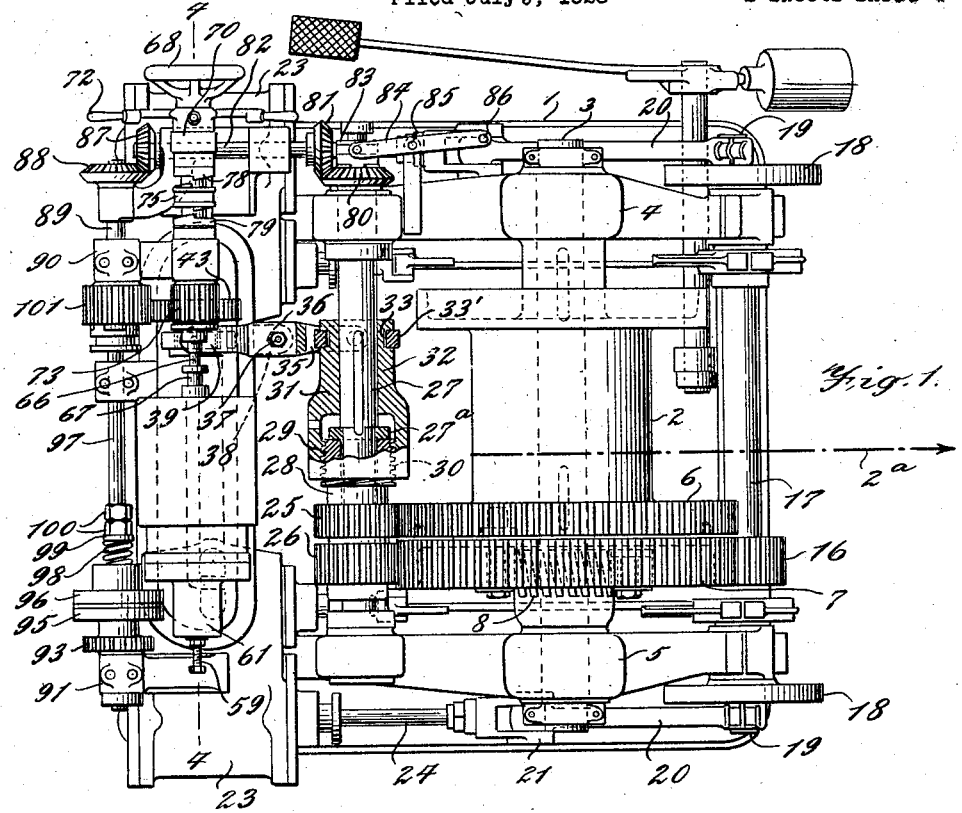
Figure 2:
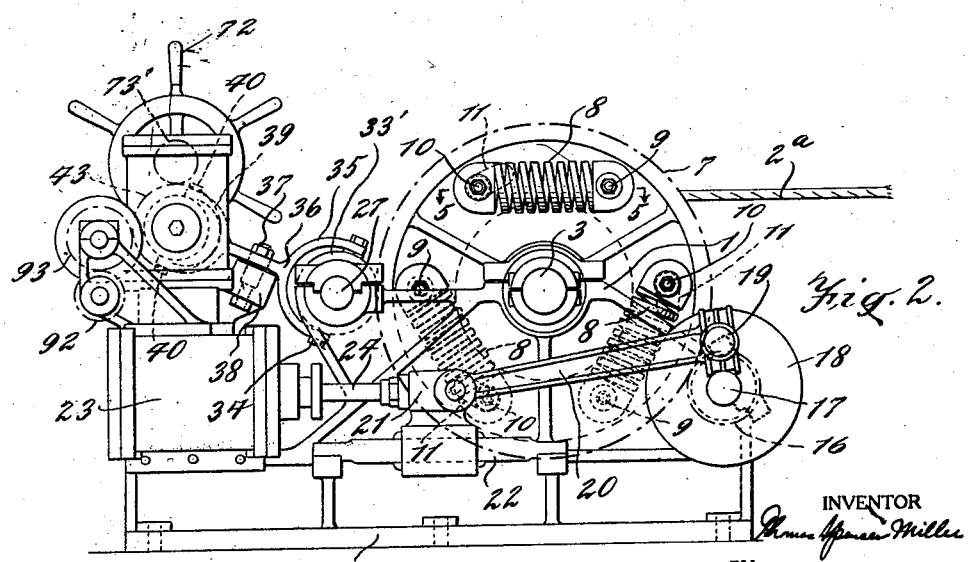
Figure 3:
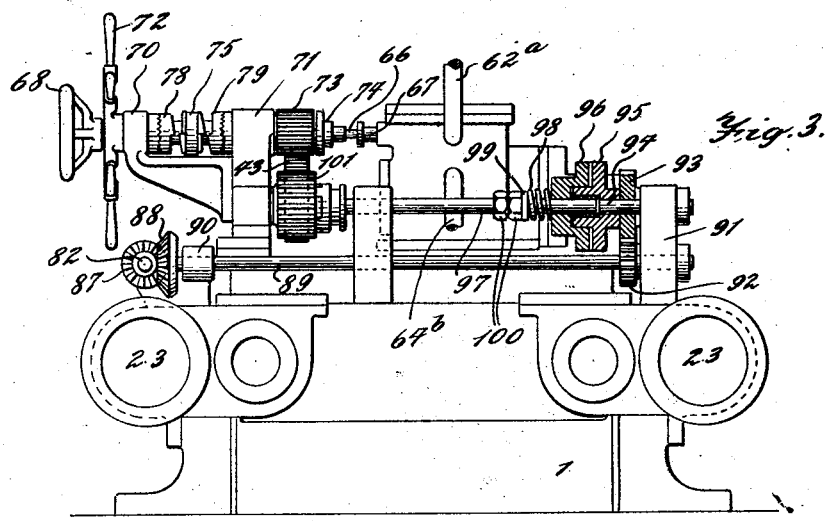
Figure 4:
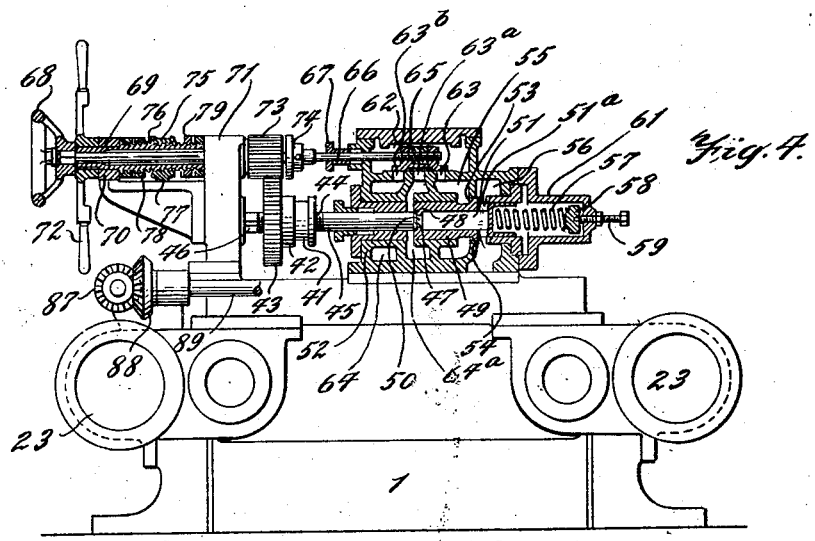
Figure 5:
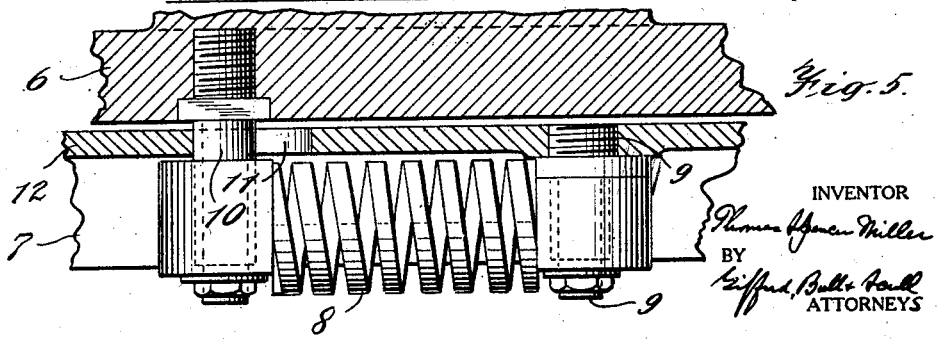

In the drawings, Fig. 1 is a plan view, partially in section, of the illustrative embodiment; Fig. 2 is a side elevation thereof; Fig. 3 is a rear elevation; Fig. 4 is a rear elevation with parts in section taken along the line 4—4 of Fig. 1, and Fig. 5 is an enlarged fragmentary section taken along the line 5—5 of Fig. 2.

I have illustrated my invention in connection with a steam actuated engine, of which 1 is the frame. A drum 2 is secured on a shaft 3 mounted in bearings 4 and 5 in the frame. A hawser 2ª is wound on the drum 2. A gear 6 is secured to the drum by stud bolts or otherwise, and a second gear 7 is loosely mounted on the shaft 3 and is connected to the gear 6 through a yielding connection which, in the form shown, comprises a plurality of springs 8, one end of each spring being attached to a stud 9 secured to the web 12 of the gear 7, while the opposite end of each of the springs 8 is secured to a shouldered stud 10 passing through a segmental slot 11 in the web 12 of the gear 7, and secured in the gear 6. The gear 7 is driven by a pinion 16 secured on a crank shaft 17 provided at its ends with crank discs 18, 18. The crank discs are provided with the usual crank pins 19 to which are jointed connecting rods 20, the inner ends of which are connected to the pin on the crosshead 21 mounted on the slide rod 22 and actuated by the pistons (not shown) in the steam cylinders 23 through the piston rods 24.

The gears 6 and 7 engage pinions 25 and 26 respectively, the latter being secured to a shaft 27 having its bearings in the frame of the engine, and the former is secured to a sleeve 28 loosely mounted on the shaft 27. The end of the sleeve 28 is screw-threaded, as at 29, the screw threads being engaged by the screw threads 30 on a traveling nut 31, the shank 32 of which is feathered on the shaft 27. A collar 27ª is set into the shaft to prevent longitudinal movement of the sleeve 28 with respect to the shaft. The end of the shank 32 is provided with an annular groove 33 which is engaged by a ring 33' to which are secured lugs or pins 34 on the ends of a yoke 35 constituting one end of a lever member 36, which is pivoted at 37 to a bracket 38. The opposite end of the lever 36 is also provided with a yoke member 39, the two ends of the yoke being provided with pins or lugs 40, which engage an annular groove 41 formed at the end of the hub 42 (see Fig. 4) of a gear 43.

The gear 43 and its hub are mounted as a nut on a threaded portion 44 of a valve stem 45. The left end of the valve stem 45, as viewed in Figure 4, is square, as indicated at 46, and is received in a square opening in the frame to prevent rotation of the valve stem and at the same time permit longitudinal movement thereof. The opposite end of the stem is bevelled, as at 47, and cooperates with a bevelled seat 48 in the end of a piston poppet valve 49 to form a valve. This piston valve 49 is slidingly mounted in a body portion 52 and is provided with an extended bevelled portion 53, which cooperates with a bevelled seat 54 in the body portion 52 to form a valve controlling communication between a live steam chamber 55 and a chamber 56, which communicates with the engine cylinders. The piston valve 49 has a relatively large axial opening 51 extending nearly its entire length and a smaller axial opening 50 adjacent the bevelled seat 48. One end of a compression spring 57 is seated in a recessed end of the valve 49, while the opposite end of this spring engages an adjustable spring cap 58, the position of which may be adjusted by an adjusting screw 59 in the end of a valve bonnet 61. The piston valve 49 is provided with lateral openings 51ª to establish communication between chamber 56 and opening 51. The reverse valve live steam chamber 62 communicates with the live steam chamber 55 through a port 63 and live steam is supplied to chamber 62 through the pipe 62ª. The valve body is also provided with a cylinder exhaust chamber 64.

The reversing valve 65 is screw threaded on a stem 66 passing through a gland 67, and to the opposite end of which is fixed a hand wheel 68. The stem 66 is surrounded by a sleeve 69 supported in bearings 70 and 71. A tension hand wheel 72 is secured to one end of the sleeve 69 while a pinion 73 is secured to the opposite end thereof and engages the gear 43. A stop collar 74 is preferably secured on the stem 66 to prevent longitudinal movement of the stem 66 and sleeve 69. A stop nut 75 is threaded on a threaded portion 76 of the sleeve 69, the stop nut 75 being held against rotation by a lug 77, engaging a slot in the frame bracket. The nut 75 engages adjustable stop collars 78 and 79 at either limit of movement.

The operation of the illustrative device is as follows:

In order to wind up the hawser, the operator rotates the hand wheel 68 and with it the stem 66, the screw threads of which move the slide valve 65 to the left, as viewed in Figure 4, thereby uncovering the port 63 and admitting live steam from the reverse valve chamber 62 through the port 63 to the live steam chamber 55. At the same time, the slide valve 65 establishes communication between ports 63$^a$ and 63$^b$ to connect cylinder exhaust chamber 64 with an exhaust chamber 64$^a$ leading to the exhaust pipe 64$^b$. The operator then rotates the hand wheel 72 to turn the sleeve 69 and the pinion 73 which, in turn, rotates gear 43. As the gear 43 and its hub are held against longitudinal movement by the engagement between the groove 41 on the hub and the pins 40 on the yoke 39, the stem 45 is moved longitudinally to the right of Fig. 4. The movement of the stem 45 to the right unseats the bevelled portion 53 of the piston valve 49 from the seat 54, thereby admitting live steam from the chamber 55 to the chamber 56, from which the steam passes to the cylinders of the engine. This causes the engine to turn the drum 2 through the pinion 16, gear 7 and springs 8 to wind in the hawser.

As this winding progresses the tension on the hawser increases and this, in turn, gradually compresses the springs 8, permitting relative rotation between the drum 2 and the gear 7. This relative rotation is transmitted to the gears 25 and 26 to cause relative rotation between the nut 31 and the screw 28 to give a longitudinal movement to the nut, and, consequently, to turn the lever 36 to move the stem 45 to the left in Figure 4, thus permitting the spring 57 slowly and gradually to move the bevelled portion 53 toward its seat 54. Thus, as the tension on the hawser increases to a predetermined amount the supply of live steam to the engine cylinders is correspondingly reduced until the piston valve 49 reaches a position where the steam passing into the engine cylinders just balances the tension on the hawser.

By my present arrangement I provide means by which any sudden increase in tension on the hawser above the desired and predetermined tension will cause the hawser to pay out, while any sudden decrease in tension on the hawser will correspondingly cause the hawser to be hauled in.

For example, a sudden increase in tension on the hawser will cause the drum 2 to rotate against the pressure of the springs 8 and this will cause a relative movement between the gears 25 and 26 and a corresponding longitudinal movement with the nut 31, which will move the stem 45 to the left of Figure 4 to permit the spring 57 to force the bevelled portion 53 toward the seat, and thus shut off at least a part of the live steam supply to the cylinders. If the relative motion between the drum and the gear 7 is sufficient, the stem will be moved far enough to the left in Figure 4 to permit the bevelled portion 53 to seat against the seat 54, which will stop the further progress of the piston valve 49 to the left. Further movement of the stem, therefore, will open the valve formed by the bevelled end 47 and the bevelled seat 48 to connect the chamber 56 with the exhaust chamber 64$^a$ through the openings 51$^a$, 51 and 52. This will relieve any compression in the cylinders and will permit the engine to overhaul and the cable to pay out. As soon as the tension on the hawser is relieved, the springs 8 will extend to cause a reverse relief movement between the gears 6 and 7 and a corresponding reverse motion of the stem 45 to restore the valve 49 to its original position.

Similarly, a decrease in tension below normal on the hawser moves the stem 45, and with it the valve 49, to the right in Figure 4, thereby admitting an additional amount of steam to the cylinders to wind in the slack until the normal tension is restored when, by the relative movement between the gears 6 and 7, as described before, the valve stem 45 will again be moved to the left in Figure 4 to restore the valve to its normal position.

By means of the hand wheel 68, the valve 65 may be moved to the extreme right of its position shown in Figure 4, to reverse the direction of rotation of the cranks 19 and the winding drum, but, since this is not part of my present invention, further description thereof is unnecessary.

I also preferably provide automatic means for maintaining a substantially constant length of the hawser through a device which will now be described. Should a permanent increase or decrease of tension be applied to the hawser with the device so far described, an indefinite amount of hawser may be paid out or wound in. To prevent this condition, means are provided for automatically increasing the normal steam pressure on the cylinders to prevent loss of hawser, or decreasing the normal steam pressure on the cylinders to prevent excessive winding in of the hawser. Assuming that there is a permanent increase of tension on the hawser, this will cause overhauling of the engine and the paying out of the hawser rotates the shaft 27 through the pinion 26. The end of the shaft 27 is provided with a bevel gear 80 which engages a bevel gear 81 on a shaft 82. The bevel gear 80 is loosely mounted on the shaft 27 and is connected thereto through a square jaw clutch member 83 operated by a lever 84, pivoted at 85, and provided at its end with an operating handle 86. It will be seen, therefore, that the bevel gear 80 can be connected to or disconnected from the shaft 27 at the will of the operator. The opposite end of the shaft 82 is provided with a bevel gear 87 which engages a bevel gear 88 on a shaft 89 mounted in bearings 90 and 91. The opposite end of the shaft 89 is provided with a gear 92 which engages a gear 93 on a stub shaft 94, the same being provided with a friction clutch member 95 which engages a second friction clutch member 96 feathered on the shaft 97 to permit it to move longitudinally thereon. The two clutch members 95 and 96 are maintained in frictional engagement by a compression spring 98 which is interposed between a collar 99 on the shaft 97 and the hub of the friction member 96. The tension of the spring 98 is adjusted by means of the lock nuts 100 engaging the collar 99. A pinion 101 is secured on the shaft 97 and engages the gear 43.

When the automatic arrangement just described is in operation, by connecting the gear 80 to the shaft 27 by the clutch member, a permanent increase in tension on the hawser, which causes the engine to overhaul and the hawser to be paid out, will rotate the shaft 27 and, through the gears 80, 81, 87 and 88, this will rotate the shaft 89, and through the gears 92 and 93 and the friction clutch members 95 and 96, the shaft 97 will be rotated and thereby the gear 101 and the gear 43. The rotation of the gear 43 will move the stem 45 to the right, (Fig. 4) thereby opening the valve 53, 54 to admit an additional amount of steam to the steam cylinders, and hence increase the normal steam pressure in the cylinders to balance the increased tension on the hawser and prevent further paying out of the hawser. Similarly, a permanent decrease in tension on the hawser will produce a decrease in steam pressure in the steam cylinders to prevent an indefinite winding in of the hawser. It is to be understood, however, that the automatic arrangement for maintaining substantially constant length of hawser does not interfere with the device for maintaining substantially constant tension on the hawser as previously described.

While I have described my invention as applied to a steam actuated engine, it will be understood that any other form of motor may be used. Thus the shaft 17 may be driven by an electric motor, the driving torque of which varies with the amperage of the motor. In such case the current to the motor could be controlled by the movement of the lever 36 similarly to the manner in which steam is controlled by such lever in the illustrative embodiment.

It will also be understood that various modifications and changes may be made without departing from the spirit of my invention.

I claim:

1. In combination, a winding drum, a motor, a rotatable member driven by said motor and located beside said drum, a yielding power transmitting device interposed between said rotatable member and said drum and located at the side of said member remote from the drum, and means responsive to relative movements of said drum and said member for controlling power supply to said motor.

2. In combination, a winding drum and the shaft on which it is mounted, a motor, a rotatable member driven by said motor and mounted on the drum shaft, a resilient connection between said rotatable member and the drum, an auxiliary shaft, relatively movable rotatable devices mounted on said auxiliary shaft and actuated by said drum and said rotatable member respectively, and means responsive to the relative movement of said devices for controlling power supply to said motor.

3. In combination, a motor, a rotary member driven by said motor, a winding drum, a yielding power-transmitting connection between the rotary member and the drum, and means to maintain the power supply to the motor substantially constant for a predetermined torque of the drum, said means being operable by relative rotation of said rotary member and said drum to decrease the power supply to the motor in accordance with a suddenly increased torque of the drum, and means to increase the power supply to the motor when the torque of the drum is increased above the predetermined amount for a sufficiently long period to cause the drum to be overhauled.

4. In combination, a winding drum provided with a gear and the shaft on which it is mounted, a motor, a gear wheel mounted on said shaft beside the drum and actuated by said motor, a yielding power transmitting device interposed between said drum and said gear wheel, an auxiliary shaft, relatively movable gears mounted on said auxiliary shaft and operated by the drum gear and said gear wheel respectively, and means responsive to the relative movements of said gears on the auxiliary shaft for controlling power supply to said motor.

5. In combination, a winding drum, a driven member, including a gear, rotatable on the axis of the drum, a motor to drive said driven member, a yielding power-transmitting connection between the driven member and the drum, a gear on said drum, a pair of relatively movable members, driven respectively by the gear on the drum and the gear on the driven member, said members being arranged to be maintained in fixed relation to each other when said gears are turning in unison and to be moved relatively when said gears rotate relatively to each other, and means operable by the relative movement of said relatively movable members to control the power supply to said motor.

6. In combination, a winding drum, a driven member, including a gear, rotatable on the axis of the drum, a motor to drive said driven member, a yielding power-transmitting connection between the driven member and the drum, a gear on said drum, a pair of co-axial rotatable members, geared respectively to the gear on the drum and the gear on the driven member and arranged to move axially relatively to each other when said members are turned at different speeds, and to maintain fixed relation when turned at the same speed, and means operable by relative movement of said relatively movable members to control the power supply to said motor.

7. In combination, a winding drum, a driven member, including a gear, rotatable on the axis of the drum, a motor to drive said driven member, a yielding power-transmitting connection between the driven member and the drum, a gear on said drum, a pair of co-axial rotatable members, geared respectively to the gear on the drum and the gear on the driven member, said members being connected by screw threads co-axial with the axes of said members to cause relatively longitudinal motion between them when said members are turned at different speeds, and means operable by relative movement of said relatively movable members to control the power supply to said motor.

8. In combination, a winding drum, a driven member rotatable on the axis of the drum, a power-transmitting spring located at one side of said axis and having one end attached to the drum and the other end attached to said member, a motor to drive said driven member, and means responsive to relative rotation of said rotary member and said drum to control the power supply to said motor.

THOMAS SPENCER MILLER.